J. M. APGAR.
COMBINED WAGON STAKE AND SKID.
APPLICATION FILED APR. 19, 1919.

1,324,718.

Patented Dec. 9, 1919.

Witnesses
P. A. Thomas

Inventor
J. M. Apgar
By Victor J. Evans
Attorney

UNITED STATES PATENT OFFICE.

JOHN M. APGAR, OF CALIFON, NEW JERSEY.

COMBINED WAGON STAKE AND SKID.

1,324,718.  Specification of Letters Patent.  Patented Dec. 9, 1919.

Application filed April 19, 1919. Serial No. 291,184.

*To all whom it may concern:*

Be it known that I, JOHN M. APGAR, a citizen of U. S. A., residing at Califon, in the county of Hunterdon and State of New Jersey, have invented new and useful Improvements in Combination Wagon Stakes and Skids, of which the following is a specification.

The present invention comprehends the provision of a combination wagon stake and skid, and makes use of a bar of substantially T-shaped formation in cross section which possesses maximum strength when used in the capacity of a skid, the base flange of the bar being provided with an extension lying in a plane therewith and terminating to provide a hook to engage one end of the wagon or truck body in the usual well known manner.

The nature and advantages of the invention will be more apparent when the following detailed description is taken in connection with the accompanying drawing, the invention residing in the construction, and arrangement of parts as claimed.

In the drawing forming part of this specification, like numerals of reference indicate similar parts in the several views, and wherein:—

Figures 1, 2:
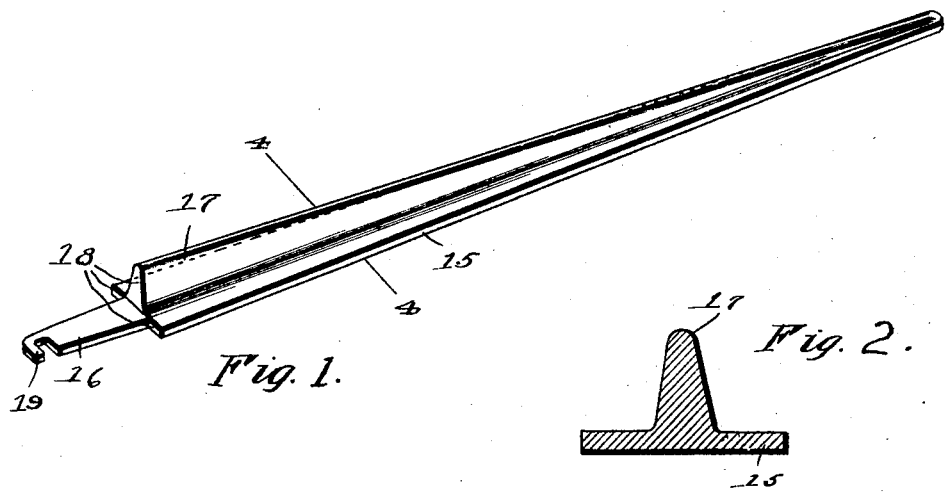
Figure 1 is a view of a wagon body stake.
Fig. 2 is a transverse sectional view thereof.

I have disclosed a wagon body stake constructed of metal for increased strength and durability, the stake including an elongated substantially flat bar 15 tapered toward one end, and reduced at its opposite end to provide a tongue 16 to be inserted in a suitable socket upon the wagon body (not shown). Projecting from one side of the bar 15 is a web or flange 17 which extends from the tapered end of the bar to the point of connection of the tongue 16 with the bar 15. This affords the stake proper a substantially T-shaped formation in cross section and also provides the stake with a plurality of shoulders arranged in triangular relation which materially assists in supporting the stake upon the wagon body, the shoulders being indicated at 18. The wagon body stake while constructed from steel, is no heavier than the ordinary wooden stake, and can be manufactured and sold at a reasonably low cost. The stakes 15 are susceptible of use in the capacity of skids and for this reason the tongue 16 is provided with a hook 19 adapted to be hooked on the rear end of the wagon or truck body, with the opposite end of the stake resting upon the ground. In this position the stake serves in the capacity of a skid for the loading or unloading of the truck with heavy articles.

What I claim is:—

A combination wagon stake and skid comprising a bar of T-shaped formation in cross section, said bar being tapered from one end to the other, a reduced extension lying in a plane with and projecting from the wide end of the base flange of said bar for supporting the bar in a vertical position when used as a stake, said extension being of rectangular formation in cross section, and terminating to provide a hook, also disposed in a plane with the extension of said base flange.

In testimony whereof I affix my signature.

JOHN M. APGAR.